(12) United States Patent
Jeon et al.

(10) Patent No.: US 6,377,563 B1
(45) Date of Patent: Apr. 23, 2002

(54) METHOD FOR HANDOFFING IN A CODE DEVISION MULTIPLE ACCESS MOBILE COMMUNICATION SYSTEM

(75) Inventors: Hyoung Goo Jeon; Soo Kun Kwon, both of Daejon (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/110,725

(22) Filed: Jul. 7, 1998

(30) Foreign Application Priority Data

Jul. 10, 1997 (KR) ............................................. 97-32146

(51) Int. Cl.7 ............................................. H04B 7/216
(52) U.S. Cl. ...................................... 370/335; 370/331
(58) Field of Search ................................. 370/335, 331, 370/332, 333, 342, 329, 334, 441, 479, 277; 375/130, 134, 135, 136, 137, 140, 146, 147; 455/436, 439, 440, 442, 443, 456, 437, 520, 525

(56) References Cited

U.S. PATENT DOCUMENTS

| | | | | |
|---|---|---|---|---|
| 5,640,414 A | * | 6/1997 | Blakeney, II et al. | 375/130 |
| 5,812,540 A | * | 9/1998 | Breckert et al. | 370/332 |
| 5,828,659 A | * | 10/1998 | Teder et al. | 370/328 |
| 5,901,354 A | * | 5/1999 | Menich et al. | 455/442 |
| 6,073,021 A | * | 6/2000 | Kumar et al. | 455/442 |
| 6,122,334 A | * | 9/2000 | Hughes | 375/350 |
| 6,151,502 A | * | 11/2000 | Padovani et al. | 455/442 |

OTHER PUBLICATIONS

Telecommunications Industry Association, Mobil Station—Base Station Compatibility Standard for Dual–Mode Wideband Spread Spectrum Cellular System, Jul. 1993, p.p. 6–152 6–158.

* cited by examiner

Primary Examiner—Dang Ton
Assistant Examiner—Phirin Sam
(74) Attorney, Agent, or Firm—Cohen, Pontani, Lieberman & Pavane

(57) ABSTRACT

This invention is directed to a method for increasing the probability of the success of handoff service in a mobile communication system. The present invention provides a handoff method for improving the talk quality in which a probability of the handoff success is raised and a probability of a call outage to disconnect a busy call is reduced. A handoff method of the present invention comprises the steps of a first step of requesting a handoff service repeatedly with a regular interval based on a timer from a mobile station to a service base station until the mobile station received the handoff service if a pilot strength of a neighboring base station is greater than a base station pilot strength value (T-ADD) when the mobile station enters a handoff service region; and a second step of holding back a new call service in the neighboring base station if the mobile station requesting the handoff service does not receive the handoff service and assigning a released channel to the mobile station requesting repeatedly the handoff service released call is present.

5 Claims, 3 Drawing Sheets

METHOD FOR HANDOFFING IN A CODE DEVISION MULTIPLE ACCESS MOBILE COMMUNICATION SYSTEM

BACKGROUND OF THE INVENTION

1. Field of the Invention

This invention relates generally to a Code Division Multiple Access (CDMA) mobile communication system, and more particularly, to a method for increasing the probability of the success of handoff service in the CDMA mobile communication system in which, when a mobile station enter a handoff service region, the mobile station continue to transmit with a regular interval a pilot strength measurement message (PSMM) to a base station to request a handoff service until the mobile station receives the handoff service if it does not so during its stay within the handoff service region and the base station holds back a new call service and assigns a released channel to the mobile station requesting repeatedly the handoff service if a released call is present.

2. Description of the Related Art service provided in a DS-CDMA (Direct Sequence-CDMA) implemented based on a IS-95 (International Standard-95) includes a soft handoff process and a hard handoff process.

The soft handoff process is a process that a mobile station is assigned simultaneously with traffic channels from two base stations while the mobile station is located between an in-service base station and its neighboring base stations. On the other hands, the hard handoff process is to be used when the frequency used in the in-service base station is different from that used in the neighboring base stations.

Such conventional handoff processes have been developed for the improvement of the voice quality over an analog process by introducing a soft handoff technique among sectors, among base stations, and among controllers of the base stations.

FIG. 1 is a diagram for explaining a relation of a pilot strength level to a distance between the base stations in the CDMA cellular system, wherein, as the mobile station moves from a service (or original) base station to a neighboring base station, the strength of the pilot signal from the service base station is reduced but the strength of the pilot signal from the neighboring base station is increased.

The pilot strength measurement message (PSMM) is a message for the measurement of the strength of the pilot signal received by a base station/base station controller from the mobile station and a handoff direction message (HDM) is a message used when the base station/base station controller requests the handoff to the mobile station.

A handoff completion message is a message which the mobile station transmits to the base station/base station controller and used for an acknowledge of the handoff direction message (HDM).

Parameters for the measurement of the pilot strength are as follows:

T_ADD is a value of the pilot strength required for the pilot signal to be a candidate set.

The mobile station transmits the PSMM message to the base station when the pilot strength of the candidate set is more by T_COMP than that of the active set.

T_DROP is a value of a minimum signal level for maintaining the base station in the active set.

T_TDROP is a value of a channel drop timer required to delete pilots belonging to the active set from the active set.

ADD means that pilots of the neighboring sectors or cells are added within the active set when the mobile station moves toward the neighboring sectors or cells in the CDMA handoff process. DROP means that pilots within the active set are deleted from the active set in the CDMA handoff process.

If the strength of the pilot signal in the second base station is greater than T_ADD when the mobile station moves from the service base station to a neighboring base station, the mobile station transmits the PSMM message to the neighboring base station through the base station controller that controls both the service base station and the neighboring base station. And then, the neighboring base station reserves an idle traffic channel and reports it to the base station controller.

The base station controller assigns the traffic channel of the neighboring base station to the mobile station through the handoff direction message (HDM) and instructs that the pilot of the neighboring base station is included in the active set. At that time, the mobile station forms communication pass simultaneously with two base stations (the service base station and the neighboring base station).

When the strength of the pilot signal of the first base station is reduced below T_DROP as the mobile station becomes closer to the neighboring base station, the mobile station activates a timer to measure the pilot strength of the service base station after a lapse of T_TDROPS sec. If the pilot strength of the base station remains below T_DROP, the PSMM message is transmitted to the control station in order to release the traffic channel with the base station 1.

The control station which has received the PSMM message releases the traffic channel in talk with the first base station by transmitting the handoff direction message to the mobile station to end the handoff.

A region in which the channel is released between T_TDROP point and T_TDROP point as shown in FIG. 1 is referred to a soft handoff region.

If the mobile station does not receive any handoff service at T_ADD point due to high traffic load in the second base station, the handoff service is held back until T_COMP point.

Also, as the mobile station which does not receive the handoff service at T_ADD becomes more distant from the first base station during the approach to T_COMP point, a call outage may occur when a radio wave environment becomes deteriorated. Accordingly, there are problems in that the failure of the handoff service is caused if the mobile station does not receive the handoff service at T_COMP point and the call is discontinued when a signal from the first base station becomes weak.

SUMMARY OF THE INVENTION

In consideration of the above problems, it is an object of the present invention to provide a handoff method for improving the talk quality in which a probability of the handoff success is raised and a probability of a call outage to disconnect a busy call is reduced by transmitting a pilot strength measurement message (PSMM) successively with a regular interval from a mobile station to a service base station to request a handoff service until the mobile station receives the handoff service if it does not so during its stay within a handoff service region when the mobile station enter the handoff service region, holding back a new call service from the base station and assigning a released channel to the mobile station requesting repeatedly the handoff service if a released call is present.

In order to accomplish the object, according to the present invention, a handoff method applicable to a mobile communication system comprises a first step of requesting a handoff service repeatedly with a regular interval based on a timer from a mobile station to a service base station until the mobile station receives the handoff service if a pilot strength of a neighboring base station is greater than a base station pilot strength value (T-ADD_when the mobile station enters a handoff service region; and a second step of holding back a new call service in the neighboring base station if the mobile station requesting the handoff service does not receive the handoff service and assigning a released channel to the mobile station requesting repeatedly the handoff service if a released call is present.

BRIEF DESCRIPTION OF THE DRAWINGS

The aforementioned aspect and other features of the invention will be explained in the following description, taken in conjunction with the accompanying drawings wherein.

DETAILED DESCRIPTION OF THE PREFERRED EMBODIMENT

Now, an preferred embodiment of the present invention will be discussed hereinafter in detail with reference to the accompany drawings.

Figure 1:
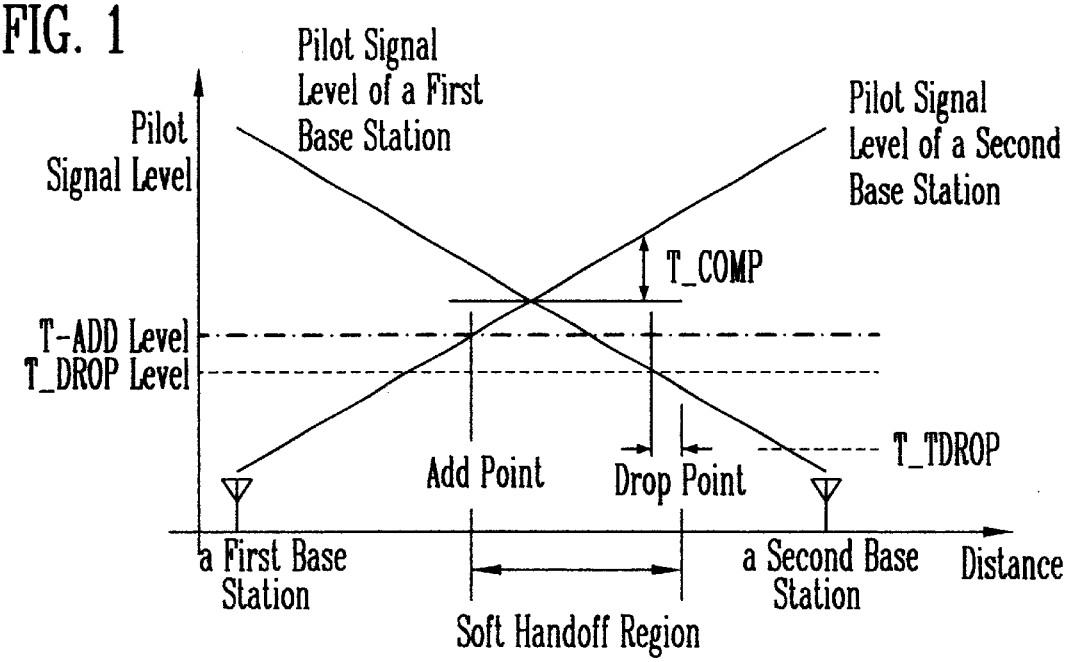
FIG. 1 illustrates a diagram for explaining a relation of a pilot signal level to a distance between the base stations in a code division multiple access (CDMA) cellular system.
Figure 2:
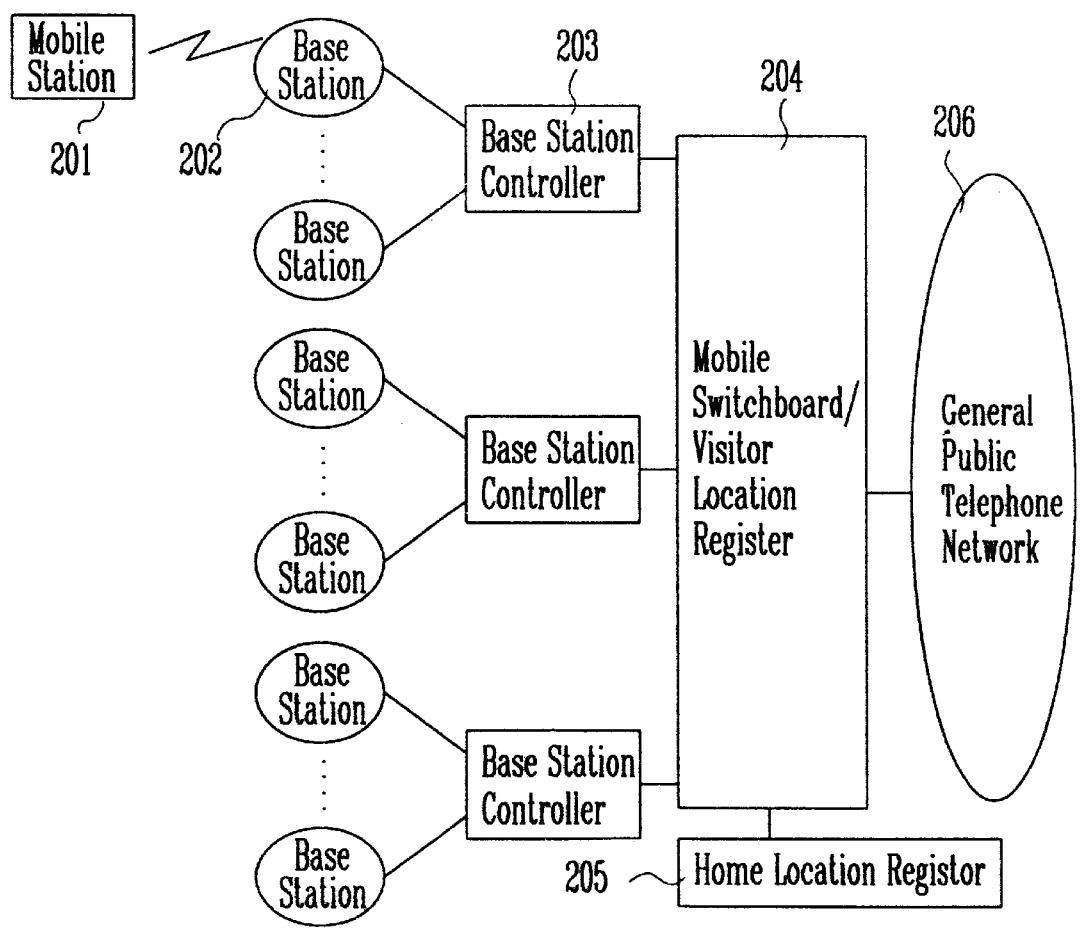
FIG. 2 illustrates a schematic block diagram a mobile communication system to which the present invention is applicable.

FIG. 2 shows a schematic block diagram of a mobile communication system to which the present invention is applicable.

In the drawings, reference numeral 201 designates a mobile station, 202 designates base stations, 203 designates base station controllers, 204 designates a mobile switchboard/visitor location register, 205 designates a home location register, and 206 designates a general public telephone network.

The mobile station 201 is a radio station for public cellular radio service usable during the movement and includes a portable mobile terminal and an in-vehicle terminal.

The base stations 202 are radio station for performing cellular radio communication service with the mobile station 201 and undertake a variety of function for mobile subscribers. The base station controllers 203 are units for controlling the base station 202.

The mobile switchboard/visitor location register 204 switches subscriber calls and stores visitor information. The home location register 205 is a database for storing subscriber information, subscriber location information, etc.

Figure 3:
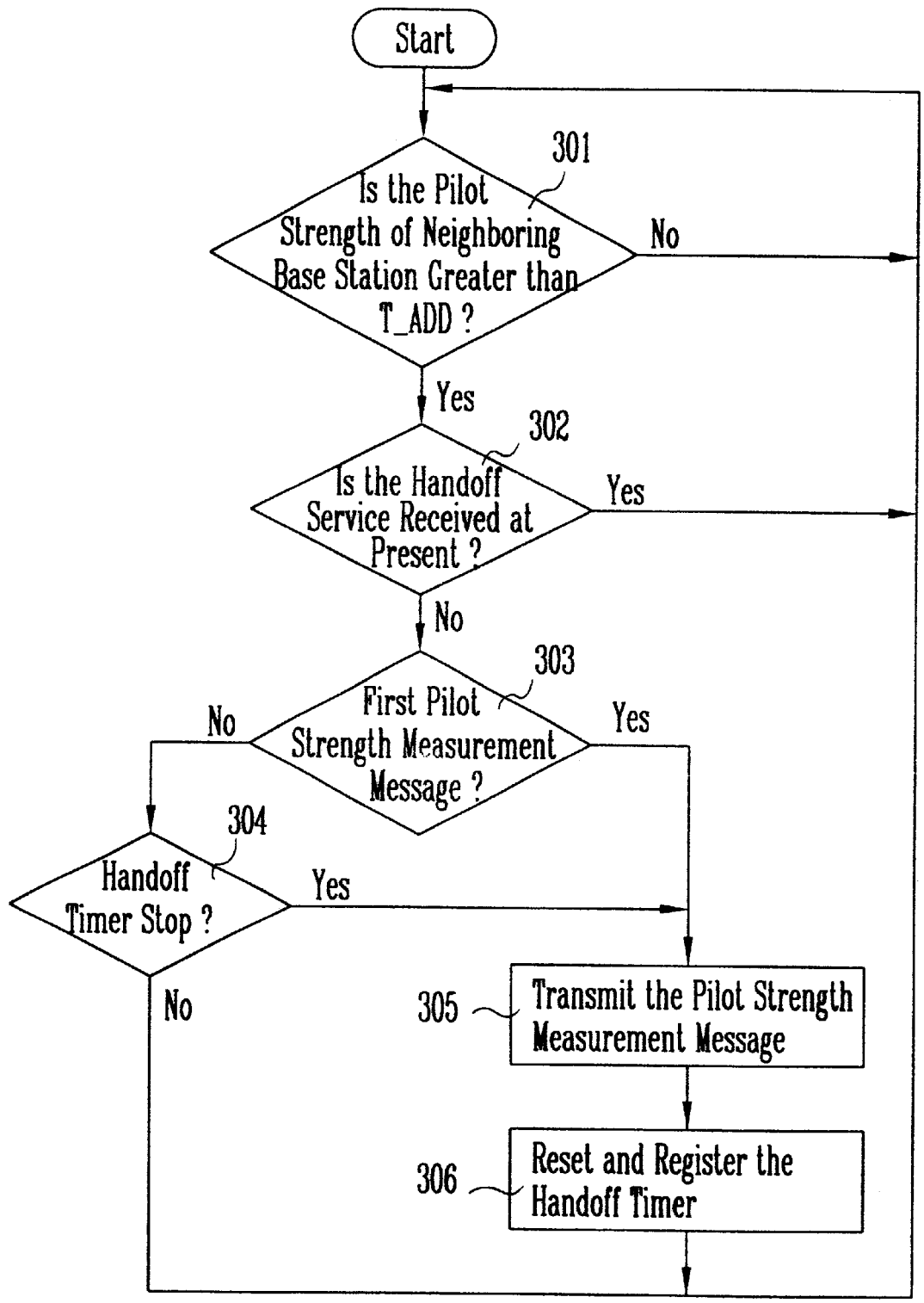
FIG. 3 illustrates a flowchart of a procedure of handoff service request in a mobile station according to the present invention.

FIG. 3 is a flowchart of a procedure of handoff service request in the mobile station according to the present invention.

The mobile station requests handoff service to the service base station by transmitting a pilot strength measurement message (PSMM) when the pilot strength of the neighboring base station is greater than T_ADD and activates a handoff timer Hd_Off_Timer as soon as the mobile station transmits the PSMM message to the base station.

Also, the mobile station stops the handoff timer and transmits the PSMM message no longer if the mobile station receives the handoff service before the handoff timer is stopped.

However, when the handoff time is expired and if the pilot strength of the neighboring base station is still greater than T_ADD, the mobile station transmits the PSMM message to the service base station.

Accordingly, the mobile station continues to transmit the PSMM message to the base station periodically and repeatedly until the mobile station receives the handoff service.

Referring to FIG. 3, first, the mobile station determines whether the pilot strength of the neighboring base station is greater than the T_ADD threshold required to be the candidate base station (step 301). If it is determined that the pilot strength of the neighboring base station is less than T_ADD, the procedure returns to the initial state.

If it is determined that the pilot strength of the neighboring base station is greater than T_ADD, the mobile station determines whether it is receiving the handoff service while it is located within a handoff region at present (step 302).

As a result of determination, if the mobile station receives the handoff service while it is located within the handoff region at present, the procedure returns to the initial state. On the other hands, if the mobile station does not receive the handoff service while it is located within the handoff region at present, it determines whether the pilot strength measurement message is a first message (step 303).

As a result of determination, if the pilot strength measurement message is a first message, the mobile station transmits the pilot strength measurement message (PSMM) to the service base station immediately (step 305) and initializes the handoff timer (step 306).

If the pilot strength measurement message is not a first message, the mobile station determines whether the handoff timer has expired (step 304).

Then, if the handoff timer has expired, the mobile station transmits the pilot strength measurement message to the service base station immediately (step 305) in order to transmit the PSMM periodically and reactivates the handoff timer (step 306). If the handoff timer has not expired, the procedure returns to the initial state to monitor whether the handoff timer is stopped.

As described above, the mobile station periodically requests the handoff service to the base station if the mobile station is located within the handoff region. Also, the mobile station continues to request the handoff service to the service base station with a regular interval until the mobile station receives the handoff service while it is located within the handoff service region. As a result, a probability of the handoff service success can be increased, resulting in the improvement of the talk quality.

Figure 4:
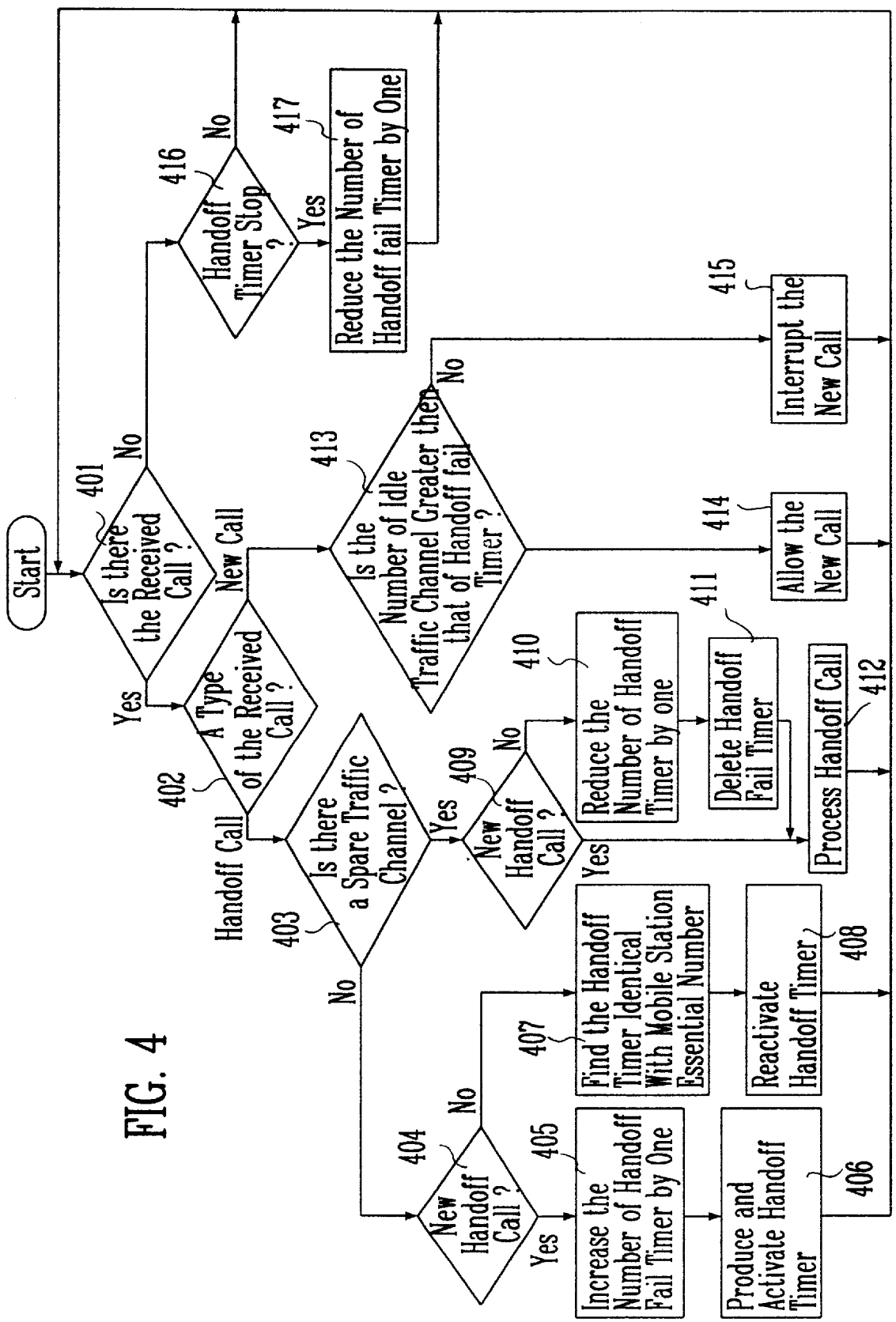
FIG. 4 illustrates a flowchart of a procedure of channel assignment in base stations according to the present invention.

FIG. 4 is a flowchart of the procedure of the channel assignment in the base station according to the present invention for explaining a method of channel assignment in the base station when the mobile station request the handoff service to the base station.

Referring to FIG. 4, first, the base station determines whether a call is received in the base station (step 401).

As a result of determination, if there is no received signal in the base station, the base 1_Timer has been stopped (step 416). Then, if it is determined that the handoff fail timer has not been stopped, the procedure returns to the initial state.

On the other hands, if it is determined that there is any stopped handoff timer, the stopped handoff timer is deleted from a list and the number of the handoff fail timer is reduced by one (step 417).

Then, the base station determines a type of a call received in the base station (step 402).

As a result of determination, if the call received in the base station is a handoff request call by the PSMM, the base station confirms whether there is any available traffic channel (step 403). If so, it is determined whether the received call is a new handoff call (step 409).

As a result of determination, if the received call is a new handoff call, the base station processes the handoff call (step 412). However, if the received call is not a new handoff call, the number of the handoff fail timer is reduced by 1 (step 410), and the handoff call is processed (step 412) after the handoff fail timer is deleted from the list (step 411).

On the other hands, if the base station can not serve the handoff service because it does not have any spare traffic channel, it confirms whether the handoff request call is a new handoff call or an existing repetitive handoff call (step 404).

As a result of confirmation, if the handoff request call is a new handoff call, the handoff fail timer (Hd_Fail_Timer) is increased by one (step 405) and a new handoff timer with a timer identifier as a mobile station essential number (ESN) is produced and activated (stop 406). On the other hands, if the handoff request call is a handoff call required more than one time repeatedly by the stop of the handoff timer (Hd_Off_Timer), a new handoff timer is not produced and the base station finds a handoff timer with the mobile essential number (ESN) identical with the timer identifier (step 407) and then reactivates it (step 408).

On the other hands, if the call received in the base station is a new call, the base station confirms the number of the idle traffic channel (Num_Idle_Tch) and the number of the handoff fail timer (Num_Hd_Timer) in activation. If the number of the idle traffic channel is equal to or less than the number of the handoff fail timer, the new call is unconditionally interrupted (step 415) and the base station allows the new call only if the number of the idle traffic channel is greater than the number of the handoff fail timer (step 414).

When the handoff service is served using the method described above, a traffic channel need not be reserved separately in order to increase a probability of the handoff success, resulting in the improvement of the efficiency of the channel use.

As explained hereinbefore, according to the present invention, since a probability of a handoff service success is increased, a talk quality can be improved. Also, since the handoff service continues to be requested at a handoff failure, a probability of a soft handoff success is increased when the mobile station is located within a soft handoff region and a call outage and a consumption of power in the mobile station within a cell boundary region are reduced, resulting in the reduction of the occurrence of an interference. In addition, when the handoff service is served, a traffic channel need not to be reserved separately in order to increase a probability of the handoff success, resulting in the improvement of the efficiency of the channel use.

The present invention has been described with reference to a particular embodiment in connection with a particular application. Those having ordinary skill in the art and access to the teachings of the present invention will recognize additional modifications and applications are within the scope of the present invention. It is therefore intended by the appended claims to cover any and all such applications, modifications, and embodiments within the scope of the present invention.

What is claimed is:

1. A handoff method applicable to a mobile communication system comprising the steps of:
   a first step of requesting a handoff service repeatedly with a regular interval based on a timer from a mobile station to a service base station until the mobile station receives the handoff service if a pilot strength of a neighboring base station is greater than a base station pilot strength value (T-ADD) when the mobile station enters a handoff service region, said first step including the steps of
      1(a) determining whether the handoff service request is a first request if the pilot strength of the neighboring base station is greater than the base station pilot strength value (T-ADD) and the mobile station does not receive the handoff service while it is located with a soft handoff region;
      1(b) transmitting the handoff service request to the service base station and activating the handoff timer if the handoff service request is a first request according to a result of determination at said step 1(a);
      1(c) determining whether the handoff timer is stopped if the handoff service request is not the first request according to a result of determination at said third step 1(a); and
      1(d) resetting the handoff timer after the handoff service request is transmitted immediately if the handoff timer is expired and returning to said first step if the handoff timer is not stopped according to a result of determination at said step 1(c); and
   a second step of holding back a new call service in the neighboring base station if the mobile station requesting the handoff service does not receive the handoff service and assigning a released channel to the mobile station requesting repeatedly the handoff service if a released call is present.

2. The method of claim 1, wherein said second step comprises the steps of:
   2(a) determining whether there is any call received in the base station;
   2(b) determining a type of the received call if there is any call received in the base station according to a result of determination at said step 2(a);
   2(c) determining whether any available traffic channel is present if the call received in the base station is a handoff request call according to a result of determination of said step 2(b);
   2(d) determining whether the received call is a new handoff call if any available traffic channel is present according to a result of determination at said step 2(c);
   2(e) processing the handoff call if the received call is a new handoff call after the number of handoff fail timers is reduced by one and the handoff fail timer is deleted if the received call is not a new handoff call according to a result of determination at said step 2(d);
   2(f) determining whether the received call is a new handoff call or a repetitive handoff call is the handoff service is not served because any available traffic channel does not exist according to a result of determination at said step 2(c);
   2(g) producing and activating a new handoff timer after the number of handoff fail timers is increased by one if the received call is new handoff call and reactivating a handoff timer with its identifier identical with the mobile station essential number is the received call is the repetitive handoff call according to a result of determination at said step 2(f);

2(h) determining whether the number if idle traffic channels is greater than that of handoff fail timers if the received call is a new handoff call according to a result of determination at said step 2(b);

2(i) allowing the new handoff call if the number of idle traffic channels is greater than that of handoff fail timers in activation and interrupting the new handoff call if the number of idle traffic channels is equal to or less than that of the handoff fail timer in activation according to a result of determination at said step 2(h); and 2(j) reducing the number of handoff fail timers by one after a stopped handoff timer is deleted from a handoff timer list if any call received in the base station is not present and any stopped handoff timer is present according to a result of determination at said step 2(a).

3. A handoff method applicable to a mobile communication system comprising the steps of:

a first step of requesting a handoff service repeatedly with a regular interval based on a timer from a mobile station to a service base station until the mobile station receives the handoff service if a pilot strength of a neighboring base station is greater than a base station pilot strength value (T-ADD) when the mobile station enters a handoff service region; and a second step of holding back a new call service in the neighboring base station if the mobile station requesting the handoff service does not receive the handoff service and assigning a released channel to the mobile station requesting repeatedly the handoff service if a released call is present, said second step comprising the steps of 2(a) determining whether there is any call received in the base station;

2(b) determining a type of the received call if there is any call received in the base station according to a result of determination at said step 2(a);

2(c) determining whether any available traffic channel is present if the call received in the base station is a handoff request call according to a result of determination of said step 2(b);

2(d) determining whether the received call is a new handoff call if any available traffic channel is present according to a result of determination at said step 2(c);

2(e) processing the handoff call if the received call is a new handoff call after the number of handoff fail timers is reduced by one and the handoff fail timer is deleted if the received call is not a new handoff call according to a result of determination at said step 2(d);

2(f) determining whether the received call is a new handoff call or a repetitive handoff call is the handoff service is not served because any available traffic channel does not exist according to a result of determination at said step 2(c);

2(g) producing and activating a new handoff timer after the number of handoff fail timers is increased by one if the received call is new handoff call and reactivating a handoff timer with its identifier identical with the mobile station essential number is the received call is the repetitive handoff call according to a result of determination at said step 2(f);

2(h) determining whether the number if idle traffic channels is greater than that of handoff fail timers if the received call is a new handoff call according to a result of determination at said step 2(b);

2(i) allowing the new handoff call if the number of idle traffic channels is greater than that of handoff fail timers in activation and interrupting the new handoff call if the number of idle traffic channels is equal to or less than that of the handoff fail timer in activation according to a result of determination at said step 2(h); and 2(j) reducing the number of handoff fail timers by one after a stopped handoff timer is deleted from a handoff timer list if any call received in the base station is not present and any stopped handoff timer is present according to a result of determination at said step 2(a).

4. The method of claim 3, wherein said first step comprises the steps of:

1(a) determining whether the handoff service request is a first request if the pilot strength of the neighboring base station is greater than the base station pilot strength value (T-ADD) and the mobile station does not receive the handoff service while it is located with a soft handoff region;

1(b) transmitting the handoff service request to the service base station and activating the handoff timer if the handoff service request is a first request according to a result of determination at said step 1(a);

1(c) determining whether the handoff timer is stopped if the handoff service request is not the first request according to a result of determination at said third step 1(a); and 1(d) resetting the handoff timer after the handoff service request is transmitted immediately if the handoff timer is expired and returning to said first step if the handoff timer is not stopped according to a result of determination at said step 1(c).

5. A handoff method applicable to a mobile communication system comprising the steps of:

a first step of requesting a handoff service repeatedly with a regular interval based on a timer from a mobile station to a service base station until the mobile station receives the handoff service if a pilot strength of a neighboring base station is greater than a base station pilot strength value (T-ADD) when the mobile station enters a handoff service region; and a second step of holding back a new call service in the neighboring base station if the mobile station requesting the handoff service does not receive the handoff service and assigning a released channel to the mobile station requesting repeatedly the handoff service if a released call is present;

wherein said first step comprises:

a third step of determining whether the handoff service request is a first request if the pilot strength of the neighboring base station is greater than the base station pilot strength value (T-ADD) and the mobile station does not receive the handoff service while it is located with a soft handoff region;

a fourth step of transmitting the handoff service request to the service base station and activating the handoff timer if the handoff service request is a first request according to a result of determination at said third step;

a fifth step of determining whether the handoff timer is stopped if the handoff service request is not the first request according to a result of determination at said third step; and a sixth step of resetting the handoff timer after the handoff service request is transmitted immediately if the handoff timer is expired and returning to said first step if the handoff timer is not stopped according to a result of determination at said fifth step; and wherein said second step comprises;

a seventh step of determining whether there is any call received in the base station;

an eighth step of determining a type of the received call if there is any call received in the base station according to a result of determination at said seventh step;

a ninth step of determining whether any available traffic channel is present if the call received in the base station is a handoff request call according to a result of determination of said eighth step;

a tenth step of determining whether the received call is a new handoff call if any available traffic channel is present according to a result of determination at said ninth step;

an eleventh step of processing the handoff call if the received call is a new handoff call after the number of handoff fail timers is reduced by one and the handoff fail timer is deleted if the received call is not a new handoff call according to a result of determination at said tenth step;

a twelfth step of determining whether the received call is a new handoff call or a repetitive handoff call is the handoff service is not served because any available traffic channel does not exist according to a result of determination at said ninth step;

a thirteenth step of producing and activating a new handoff timer after the number of handoff fail timers is increased by one if the received call is new handoff call and reactivating a handoff timer with its identifier identical with the mobile station essential number is the received call is the repetitive handoff call according to a result of determination at said twelfth step;

a fourteenth step of determining whether the number if idle traffic channels is greater than that of handoff fail timers if the received call is a new handoff call according to a result of determination at said eight step;

a fifteenth step of allowing the new handoff call if the number of idle traffic channels is greater than that of handoff fail timers in activation and interrupting the new handoff call if the number of idle traffic channels is equal to or less than that of the handoff fail timer in activation according to a result of determination at said fourteenth step;

a sixteenth step of reducing the number of handoff fail timers by one after a stopped handoff timer is deleted from a handoff timer list if any call received in the base station is not present and any stopped handoff timer is present according to a result of determination at said seventh step.

* * * * *